(12) United States Patent
Chen et al.

(10) Patent No.: US 11,955,639 B2
(45) Date of Patent: Apr. 9, 2024

(54) COMPOSITE INTERLAYER FOR LITHIUM METAL BASED SOLID STATE BATTERIES AND THE METHOD OF MAKING THE SAME

(71) Applicant: GM GLOBAL TECHNOLOGY OPERATIONS LLC, Detroit, MI (US)

(72) Inventors: Mengyuan Chen, Madison Heights, MI (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 273 days.

(21) Appl. No.: 17/307,664

(22) Filed: May 4, 2021

(65) Prior Publication Data

US 2022/0359875 A1 Nov. 10, 2022

(51) Int. Cl.
*H01M 4/62* (2006.01)
*H01M 4/02* (2006.01)
*H01M 4/134* (2010.01)
*H01M 10/0562* (2010.01)

(52) U.S. Cl.
CPC ............ *H01M 4/62* (2013.01); *H01M 4/134* (2013.01); *H01M 10/0562* (2013.01); *H01M 2004/027* (2013.01); *H01M 2220/20* (2013.01); *H01M 2300/0068* (2013.01)

(58) Field of Classification Search
None
See application file for complete search history.

(56) References Cited

U.S. PATENT DOCUMENTS

| | | |
|---|---|---|
| 8,974,946 B2 | 3/2015 | Cai et al. |
| 9,123,939 B2 | 9/2015 | Xiao et al. |
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,362,552 B2 | 6/2016 | Sohn et al. |
| 9,373,829 B2 | 6/2016 | Xiao et al. |
| 9,437,871 B2 | 9/2016 | Zhou et al. |
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,431,849 B2 | 10/2019 | Yersak et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 10,991,946 B2 | 4/2021 | Xiao et al. |
| 11,094,996 B2 | 8/2021 | Xiao et al. |
| 11,239,459 B2 | 2/2022 | Yersak et al. |
| 2001/0024757 A1* | 9/2001 | Hwang ............... H01M 10/052 429/231.95 |
| 2004/0058232 A1* | 3/2004 | Kim .................... H01M 4/0483 429/231.95 |
| 2004/0126653 A1* | 7/2004 | Visco ................... H01M 4/382 429/231.95 |
| 2009/0029263 A1* | 1/2009 | Zaghig ..................... C08J 3/095 429/188 |
| 2012/0088163 A1* | 4/2012 | Ryu ....................... H01M 12/06 429/405 |
| 2012/0094187 A1* | 4/2012 | Kwon .................... C08J 5/2256 429/309 |
| 2014/0265557 A1 | 9/2014 | Huang et al. |
| 2015/0056387 A1 | 2/2015 | Dadheech et al. |
| 2015/0056493 A1 | 2/2015 | Dadheech et al. |

(Continued)

FOREIGN PATENT DOCUMENTS

CN 115312840 A 11/2022
DE 102022107900 A1 11/2022

(Continued)

OTHER PUBLICATIONS

Machine translation of TW 1705601 B1, published on Sep. 21, 2020 (Year: 2020).*
Machine translation of JP6481989 B1, published on Mar. 13, 2019 (Year: 2019).*
Pershina, S.V., Antonov, B.D., Farlenkov, A.S., Vovkotrub, E.G.— Glass-ceramics in Li1-xAlxGe2-x(PO4)3 system: The effect of Al2O3 addition on microstructure, structure and electrical properties, Journal of Alloys and Compounds, 835 (2020) (Year: 2020).*

(Continued)

*Primary Examiner* — Anca Eoff

(74) *Attorney, Agent, or Firm* — Harness, Dickey & Pierce, P.L.C.

(57) ABSTRACT

A solid-state electrochemical cell that cycles lithium ions includes a solid-state electrolyte that defines a first major surface and an electrode that defines a second major surface. The solid-state electrochemical cell also includes an interfacial layer disposed between the first major surface of the solid-state electrolyte and the second major surface of the electrode. The interfacial layer may include an ion-conductor disposed in an organic matrix.

17 Claims, 7 Drawing Sheets

(56) References Cited

U.S. PATENT DOCUMENTS

| | | |
|---|---|---|
| 2015/0056507 A1 | 2/2015 | Dadheech et al. |
| 2015/0349307 A1 | 12/2015 | Dadheech et al. |
| 2016/0172706 A1 | 6/2016 | Xiao et al. |
| 2016/0172710 A1 | 6/2016 | Liu et al. |
| 2017/0271678 A1 | 9/2017 | Yang et al. |
| 2018/0301707 A1* | 10/2018 | Pan ...................... H01M 4/628 |
| 2019/0326070 A1 | 10/2019 | Dai et al. |
| 2019/0372155 A1 | 12/2019 | Yersak et al. |
| 2019/0393549 A1 | 12/2019 | Yersak et al. |
| 2020/0395630 A1 | 12/2020 | Yersak et al. |
| 2021/0135230 A1 | 5/2021 | Xu et al. |

FOREIGN PATENT DOCUMENTS

| | | | |
|---|---|---|---|
| JP | 6481989 B1 | * | 3/2019 |
| TW | 1705601 B | * | 9/2020 |
| WO | 2014182281 A1 | | 11/2014 |
| WO | 2017045573 A1 | | 3/2017 |

OTHER PUBLICATIONS

Kim, S.H., Kim, J.Y., Kim, H.S., Cho, H.N.—Ionic conductivity of polymer electrolytes based on phosphate and polyether copolymers, Solid State Ionics 116 (1999), pp. 63-71 (Year: 1999).*

* cited by examiner

COMPOSITE INTERLAYER FOR LITHIUM METAL BASED SOLID STATE BATTERIES AND THE METHOD OF MAKING THE SAME

GOVERNMENT FUNDING

This invention was made with government support under Agreement No. DE-EE0008863 awarded by the U.S. Department of Energy. The Government may have certain rights in the invention.

INTRODUCTION

This section provides background information related to the present disclosure which is not necessarily prior art.

Electrochemical energy storage devices, such as lithium-ion batteries, can be used in a variety of products, including automotive products, including for start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. In electrochemical cells, such as in lithium-ion batteries, one of the two electrodes serves as a positive electrode or cathode, and the other electrode serves as a negative electrode or anode. Conventional rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery.

A separator and/or electrolyte may be disposed between the negative and positive electrodes. The electrolyte is suitable for conducting lithium ions between the electrodes and, like the two electrodes, may be in a solid form, a liquid form, or a solid-liquid hybrid form. For example, solid-state batteries include a solid-state electrolyte disposed between solid-state electrodes, where the solid-state electrolyte physically separates the electrodes and can serve as a separator and ionic conductor, so that a distinct separator is not required.

Lithium-ion batteries that include a negative electrode or anode comprising lithium metal are promising in that lithium metal has a high theoretical specific capacity and a low negative electrochemical potential, for example, in comparison to a standard hydrogen electrode. Also, solid-state batteries may have various performance advantages over conventional batteries that use liquid electrolytes, potentially including a wide voltage window and enhanced safety.

However, lithium metal anodes may be subject to high reactivity, unintended reactions, for example, side-reactions, between the solid-state electrolyte and the lithium metal, may contribute to shortened life and/or cycling of the battery. Further, establishing good contact between a solid electrolyte and solid electrode, such as a lithium metal anode, can be more challenging than in a battery with a liquid electrolyte. Further still, microscopic and macroscopic void spaces at interfaces between solid components may exist or arise over time after cycling, which may contribute to high interfacial impedance. Thus, it would be desirable to suppress unintended side-reactions and, at the same time, improve contact and reduce interfacial impedance between a lithium metal anode and a solid-state electrolyte in a solid-state battery.

SUMMARY

This section provides a general summary of the disclosure, and is not a comprehensive disclosure of its full scope or all of its features.

The present disclosure relates to a composite interlay for lithium metal based solid state batteries and to methods of making the same.

For example, in some aspects the present disclosure provides a solid-state electrochemical cell that cycles lithium ions. The electrochemical cell may include a solid-state electrolyte defining a first major surface. The electrochemical cell may also include a negative electrode defining a second major surface. The electrochemical cell may also include an interfacial layer disposed between the first major surface of the solid-state electrolyte and the second major surface of the electrode. The interfacial layer may include an ion-conductor disposed in an organic matrix.

In one aspect, the negative electrode includes lithium metal.

In one aspect, the ion-conductor includes $LiNO_3$, $Li_3PO_4$, $Li_3P$, $Li_2PO_2N$ (LIPON), $Li_3PS_4$, $Li_3ClO$, $LiF$, $Li_2S$, $Li_3N$, $ZnO$, $Al_2O_3$, $SnO_2$, $Au$, $Si$, $Ge$, $Mg$, $Al$, $In$, polyethylene oxide (PEO), polypropylene (PP), 1-butyl-3-methylimidazolium-bis(fluorosulfonyl)imide (BMIM-FSI), particulate graphite, acetylene black, carbon fibers, carbon nanotubes, graphene, or combinations thereof.

In one aspect, the ion-conductor includes $LiNO_3$, $Li_3PO_4$, or both.

In one aspect, the solid-state electrolyte includes $Li_{1+x}Al_xGe_{2-x}(PO_4)_3$ where $0<x<1$ (LAGP) or $Li_{1+x}Al_xTi_{2-x}(PO_4)_3$ where $0<x<1$ and $0<y<2$ (LATP), $Li_xLa_yTiO_3$ where $0<x<1$ and $0<y<1$ (LLTO), $Li_{2+2x}Zn_{1-x}GeO_4$ where $0<x<1$ (LISICON), $Li_{10}GeP_2S_{12}$ (LGPS), $Li_{3.25}Ge_{0.25}P_{0.75}S_4$, $Li_4GeS_4$, $Li_6PS_5Cl$, $Li_7La_3Zr_2O_{12}$ (LLZO), $Li_2PO_2N$ (LIPON), or combinations thereof.

In one aspect, the solid-state electrolyte includes $Li_{1+x}Al_xGe_{2-x}(PO_4)_3$ where $0<x<1$ (LAGP).

In one aspect, the interfacial layer has a thickness of greater than or equal to about 10 nm to less than or equal to about 500 nm.

In one aspect, the interfacial layer is formed by a method that may include preparing a mixture including an ionic conductor precursor, an organophosphate, and a non-polar organic solvent. The method may also include applying the mixture to the negative electrode. The method may also include removing at least a portion of the non-polar organic solvent from the mixture to form the interfacial layer. In one aspect, the mixture is applied to the negative electrode for a duration of about one (1) hour. In one aspect, the ionic conductor precursor includes $LiNO_3$.

In one aspect, the organophosphate includes trimethyl phosphate (TMP), triethyl phosphate, tris(1,3-dichloro-2-propyl) phosphate, tris(2-chloroethyl) phosphate, tris(1-chloro-2-propyl) phosphate, tetraethyl pyrophosphate, and tris(2-methylphenyl) phosphate, or combinations thereof.

In one aspect, the non-polar organic solvent includes diethyl ether, 1,2-dimethoxyethane, 1, 4-dioxane, tetraethylene glycol dimethyl ether (TEGDME), carbon tetrachloride, benzene, hexane, methylene chloride, or combinations thereof.

Additionally or alternatively, in some aspects the present disclosure provides a method of making a solid-state electrochemical cell that cycles lithium ions. The method may include preparing a mixture including an ionic conductor precursor, an organophosphate, and a non-polar organic solvent. The method may also include applying the mixture to a negative electrode. The method may also include removing at least a portion of the non-polar organic solvent from the mixture to form a coating.

In one aspect, the method may further include positioning the negative electrode adjacent a solid-state electrolyte such that the coating is disposed between the negative electrode and the solid-state electrolyte and pressing the negative electrode and the solid-state electrolyte together such that the coating forms an interfacial layer. In one aspect, the interfacial layer is disposed between a first major surface of the solid-state electrolyte and a second major surface of the solid electrode, wherein the interfacial layer includes an ion-conductor disposed in an organic matrix. In one aspect, the negative electrode includes lithium metal and the ion-conductor includes $LiNO_3$, $Li_3PO_4$, $Li_3P$, $Li_2PO_2N$ (LIPON), $Li_3PS_4$, $Li_3ClO$, LiF, $Li_2S$, $Li_3N$, ZnO, $Al_2O_3$, $SnO_2$, Au, Si, Ge, Mg, Al, In, polyethylene oxide (PEO), polypropylene.

In one aspect, the mixture is applied to the negative electrode for a duration of about one (1) hour.

In one aspect, the ionic conductor precursor includes $LiNO_3$.

In one aspect, the organophosphate includes trimethyl phosphate (TMP), triethyl phosphate, tris(1,3-dichloro-2-propyl) phosphate, tris(2-chloroethyl) phosphate, tris(1-chloro-2-propyl) phosphate, tetraethyl pyrophosphate, and tris(2-methylphenyl) phosphate, or combinations thereof.

In one aspect, the non-polar organic solvent includes diethyl ether, 1,2-dimethoxyethane, 1, 4-dioxane, tetraethylene glycol dimethyl ether (TEGDME), carbon tetrachloride, benzene, hexane, methylene chloride, or combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
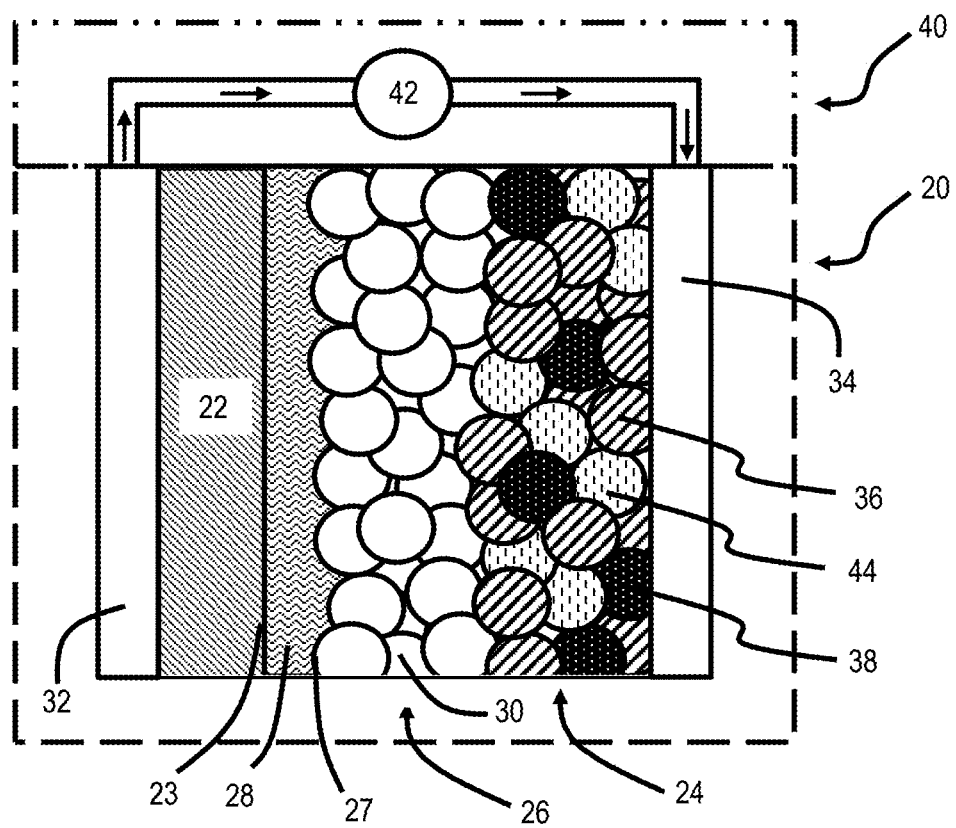
FIG. 1 is an illustration of an example of a solid-state battery.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

As discussed above, lithium-ion batteries that include a negative electrode or anode comprising lithium metal are promising in that lithium metal has a high theoretical specific capacity of about 3,860 mAh/g, a low density of about 0.53 g/cm$^3$, and a low negative electrochemical potential of about −3.04 V, in comparison to a standard hydrogen electrode. However, lithium metal anodes may be subject to high reactivity, for example, unintended side-reactions between the lithium metal and a solid electrolyte, potentially leading to shortened life and/or cycling of the battery. Further, large volume changes that can lead to dendrite growth, a mossy structure, and low cycle efficiency. Furthermore, as discussed above, solid-state batteries incorporating solid electrodes, like lithium negative electrodes, can exhibit high interfacial impedance due to poor contact between the solid lithium with solid electrolyte materials.

In various aspects, the present disclosure provides an electrochemical cell including an interfacial layer disposed between a solid electrode, like a lithium electrode, and a solid electrolyte. The present disclosure also provides a method of forming the electrochemical cell having the interfacial layer. In various aspects, the interfacial layer is effective to suppress unintended side-reactions between the lithium metal and the solid electrolyte and reduce interfacial impedance between the solid electrode and the solid electrolyte.

An exemplary and schematic illustration of an electrochemical cell 20 (also referred to herein as "the battery"), that cycles lithium ions is shown in FIG. 1. Notably, the components shown in the electrochemical cell 20 are not to scale. Unless specifically indicated otherwise, the term "ions" as used herein refers to lithium ions, but in alternative aspects, may also refer to other ions, such as sodium ions. The battery 20 includes a negative electrode 22, a positive electrode 24, a solid-state electrolyte 26 disposed between the negative electrode 22 and the positive electrode 24, and an interfacial layer 28 disposed between the negative electrode 22 and the solid-state electrolyte. The solid-state electrolyte 26 is both a separator that physically separates the negative electrode 22 from the positive electrode 24 and an ion-conducting electrolyte. The solid-state electrolyte 26 may be defined by a plurality of solid-state electrolyte particles 30. A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). As shown, the negative electrode 22 may be a solid film comprising an electroactive material, while the positive electrode 24 may be a composite electrode that comprises a plurality of electroactive material particles 36, either solid electrolyte particles 44, and optionally a plurality of electrically conductive particles 38.

The battery 20 can generate an electric current (indicated by the block arrows) during discharge by way of reversible electrochemical reactions that occur when the external circuit 40 is closed (to connect the negative electrode 22 and the positive electrode 24) and the negative electrode 22 contains a relatively greater quantity of lithium. The chemical potential difference between the negative electrode 22 and the positive electrode 24 drives electrons produced by the oxidation of inserted lithium at the negative electrode 22 through the external circuit 40 towards the positive electrode 24. Ions, which are also produced at the negative electrode 22, are concurrently transferred through the solid-state electrolyte 26 towards the positive electrode 24. The electrons flow through the external circuit 40, and the ions migrate across the solid-state electrolyte 26 to the positive electrode 24 where they may be plated, reacted, or intercalated. The electric current passing through the external circuit 40 can be harnessed and directed through the load device 42 (in the direction of the block arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The connection of the external power source to the battery 20 compels the non-spontaneous oxidation of one or more metal elements at the positive electrode 24 to produce electrons and ions. The electrons, which flow back towards the negative electrode 22 through the external circuit 40, and the ions, which move across the solid-state electrolyte 26 back towards the negative electrode 22, reunite at the negative electrode 22 and replenish it with lithium for consumption during the next battery discharge cycle. As such, each discharge and charge event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators. In many of the configurations of the battery 20, each of the negative electrode current collector 32, the negative electrode 22, the solid-state electrolyte 26, the positive electrode 24, and the positive electrode current collector 34 are prepared as relatively thin layers (for example, from several microns to a millimeter or less in thickness) and assembled in layers connected in parallel arrangement to provide a suitable electrical energy and power package. In various other instances, the battery 20 may include electrodes 22, 24 that are electrically connected in series.

Further, in certain aspects, the battery 20 may include a variety of other components that, while not depicted here, are nonetheless known to those of skill in the art. For instance, the battery 20 may include a casing, a gasket, terminal caps, and any other conventional components or materials that may be situated within the battery 20, including between or around the negative electrode 22, the positive electrode 24, and/or the solid-state electrolyte 26, by way of non-limiting example. As noted above, the size and shape of the battery 20 may vary depending on the particular applications for which it is designed. Battery-powered vehicles and hand-held consumer electronic devices are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate an electric current to the load device 42 that can be operatively connected to the external circuit 40. The load device 42 may be powered fully or partially by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy.

With further reference to FIG. 1, the solid-state electrolyte 26 provides electrical separation—preventing physical contact—between the negative electrode 22, i.e., an anode, and the positive electrode 24, i.e., a cathode. The solid-state electrolyte 26 also provides a minimal resistance path for internal passage of ions. In various aspects, as noted above, the plurality of solid-state electrolyte particles 30 may define the solid-state electrolyte 26. In certain aspects, the solid-state electrolyte particles 30 comprise a NASICON-type superionic conducting glass ceramic, such as $Li_{1+x}Al_xGe_{2-x}(PO_4)_3$ (LAGP), or $Li_{1+x}Al_xTi_{2-x}(PO_4)_3$ where $0<x<1$ and $0<y<2$ (LATP), a Perovskite such as $Li_xLa_yTiO_3$ where $0<x<1$ and $0<y<1$ (LLTO); $Li_{2+2x}Zn_{1-x}GeO_4$ where $0<x<1$ (LISICON); a sulfide-type ceramic/glass: $Li_{10}GeP_2S_{12}$ (LGPS), $Li_{3.25}Ge_{0.25}P_{0.75}S_4$, $Li_4GeS_4$ and $Li_6PS_5Cl$; a ceramic oxide, such as garnet type $Li_aLa_bZr_cO_d$ materials, such as $Li_7La_3Zr_2O_{12}$ (LLZO); $Li_2PO_2N$ (LIPON), and combinations thereof, as non-limiting examples. In certain embodiments, the solid-state electrolyte particles 30 optionally comprise a dopant. Solid-state electrolyte materials may be selected to be stable in the presence of certain electroactive materials, like lithium.

The solid-state electrolyte 26 may be in the form of a layer or a composite that comprises the first plurality of solid-state electrolyte particles 30. For example, the solid-state electrolyte 26 may be in the form of a layer having a thickness greater than or equal to about 1 μm to less than or equal to about 1 mm, and in certain aspects, optionally greater than or equal to about 1 μm to less than or equal to about 100 μm. Such solid-state electrolyte 26 after processing into a consolidated form or final state may have an interparticle porosity between the respective solid-state electrolyte particles of less than or equal to about 10 vol. %, optionally less than or equal to about 5 vol. %.

The negative electrode 22 may be formed from a lithium host material that is capable of functioning as a negative terminal of a lithium-ion. In certain aspects, the negative electrode 22 may be a layer, for example, a solid film comprising lithium metal. In certain variations, the negative electrode 22 may comprise elemental lithium or an alloy of lithium. In other variations, the negative electroactive material forming the negative electrode 22 may comprise a silicon-based material, for example, a silicon alloy. In yet other variations, the negative electrode 22 may comprise a carbonaceous material, such as graphite or graphene. In still further variations, the negative electrode 22 may comprise one or more negative electroactive materials, such as lithium titanium oxide ($Li_4Ti_5O_{12}$) and sodium titanium oxide ($Na_4Ti_5O_{12}$); one or more metal oxides, such as $V_2O_5$; and metal sulfides, such as FeS. In alternative aspects not shown in FIG. 1, the negative electrode 22 may be a composite type of electrode having a plurality of negative electroactive material particles distributed within a matrix with an electrolyte and optional electrically conductive particles, as will be described in the context of the positive electrode 24.

The negative electrode current collector 32 may be formed from copper (Cu), stainless steel, or any other electrically conductive material known to those of skill in the art.

While in the context of lithium-ion batteries, lithium intercalates and/or forms alloys within the electrode active materials, in the context of a lithium metal battery, instead of intercalating or alloying, the lithium dissolves from the negative electrode and migrates to the positive electrode where it reacts/plates during discharge and, during charging, the lithium plates on the negative electrode.

Thus, the positive electrode 24 may be formed from a lithium-based electroactive material that can undergo lithium cycling (e.g., plating and deplating) while functioning as the positive terminal of the battery 20. For example, while not limiting, in certain variations, the positive electrode 24 may be defined by the plurality of positive solid-state electroactive particles 36. However, it should be noted that the positive electrode 24 is not limited to the embodiment shown in FIG. 1 and may be in a variety of forms, including a solid electrode, a semi-solid, gas, or liquid electrode.

In certain instances, for example, as illustrated in FIG. 1, the positive electrode 24 is a composite comprising a mixture of the positive solid-state electroactive particles 36 and solid-state electrolyte particles 44. For example, the positive electrode 24 may include greater than or equal to about 10 wt. % to less than or equal to about 95 wt. %, and in certain aspects, optionally greater than or equal to about 50 wt. % to less than or equal to about 90 wt. %, of the positive solid-state electroactive particles 36 and greater than or equal to about 5 wt. % to less than or equal to about 70 wt. %, and in certain aspects, optionally greater than or equal to about 10 wt. % to less than or equal to about 30 wt. %, of the plurality of solid-state electrolyte particles 44. The positive electrode 24 may have an interparticle porosity between the positive solid-state electroactive particles 36 and/or the solid-state electrolyte particles 44 that is less than or equal to about 20 vol. %, optionally less than or equal to about 10 vol. %. In certain variations, the plurality of solid-state electrolyte particles 44 may be the same as or different from the of solid-state electrolyte particles 30 in the separator 26, with respect to composition, size, or combinations thereof.

The positive electrode 24 may include any suitable positive electroactive materials that can cycle lithium. In various aspects, the positive electrode 24 may be formed of a positive electroactive material 36 that is one of a layered-oxide cathode, a spinel cathode, or a polyanion cathode. For example, in the instances of a layered-oxide cathode (e.g., rock salt layered oxides), the positive solid-state electroactive particles 36 may comprise one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), and $Li_{1+x}MO_2$ (where $0 \leq x \leq 1$). The spinel cathode may include one or more positive electroactive materials, such as $LiMn_2O_4$ and $LiNi_xMn_{1.5}O_4$. The polyanion cation may include, for example, a phosphate such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ and/or a silicate such as $LiFeSiO_4$. In various aspects, the positive solid-state electroactive particles 36 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In other aspects, additional materials that may be appropriate to provide a desired voltage between the positive electrode 24 and the negative electrode 22 may be used.

In certain variations, the particles 36 may be optionally intermingled with one or more electrically conductive materials 38 that provide an electron conduction path and/or at least one polymeric binder material (not shown) that improves the structural integrity of the positive electrode 24. Electrically conductive materials 38 may include, for example, carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like. In certain aspects, mixtures of the conductive materials may be used. The positive solid-state electroactive particles 36 may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), lithium polyacrylate (LiPAA), and/or sodium polyacrylate (NaPAA) binders.

The positive electrode 24 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive materials 38 and greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders.

The positive electrode current collector 34 may be formed from aluminum (Al) or any other electrically conductive material known to those of skill in the art.

Referring again to FIG. 1, the interfacial layer 28 may be disposed between the negative electrode 22 and the solid-state electrolyte 26. For example, as illustrated in FIG. 1, the negative electrode 22 may include a first major surface 23 generally facing the solid-state electrolyte 26 and the solid-state electrolyte 26 may include a second major surface 27 generally facing the negative electrode.

The interfacial layer 28 may comprise a composite material. For example, in some aspects the composite material comprises one or more ion-conductors disposed within an organic matrix.

In various aspects, the one or more ion-conductors may comprise components, for example, compounds, that are ionically-conductive and electrochemically stable with respect to lithium metal. For example, in some aspects, the one or more ion-conductors may be effective and cause the interfacial layer 28 to exhibit ionic conductivity. Not intending to be bound by theory, the interfacial layer 28 may be effective to provide a route of ionic movement between the negative electrode 22 and the solid-state electrolyte 26, for example, at the interface between the negative electrode 22 and the solid-state electrolyte 26.

In various aspects, examples of ion-conductors may include $LiNO_3$; $Li_3PO_4$; phosphorus-containing compounds, such as $Li_3P$, $Li_2PO_2N$ (LIPON), and $Li_3PS_4$; halide-containing compounds, such as $Li_3ClO$ and $LiF$; sulfide-containing compounds such as $Li_2S$; nitride-containing compounds, such as $Li_3N$; oxides such as $ZnO$, $Al_2O_3$, $SnO_2$; metals, such as Au, Si, Ge, Mg, Al, and In; polymers as polyethylene oxide (PEO) and polypropylene (PP); ionic liquids, such as 1-butyl-3-methylimidazolium-bis(fluorosulfonyl)imide (BMIM-FSI); and carbon-based materials, such as particulate graphite, acetylene black (such as KETCHEN' black or DENKA™ black), carbon fibers and nanotubes, graphene, and the like.

In some aspects, the organic matrix may include one or more suitable organic species. For example, and as will be discussed, the organic matrix may include various organic species resulting from the in situ formation of the ionic conductors, for example, when the interfacial layer 28 is formed according the methods set forth herein.

Additionally, in some aspects, the organic matrix may be effective to provide physical structural to and/or rigidity to the interfacial layer. Additionally or alternatively, in various aspects, the organic matrix may be effective to stabilize the composition of the interfacial layer 28, for example, to retain the ionic conductors within the interfacial layer 28. In various embodiments, the interfacial layer 28 may be characterized as having a thickness of greater than or equal to about 10 nm to less than or equal to about 500 nm.

Additionally, in some aspects, a method of forming a battery, such as the battery 20 discussed with respect to FIG. 1, may include preparing a mixture including an ionic conductor precursor, an organophosphate, and a non-polar organic solvent. Examples of the ionic conductor precursor include, but are not limited to, $LiNO_3$. Examples of the organophosphate include, trimethyl phosphate (TMP), triethyl phosphate, tris(1,3-dichloro-2-propyl) phosphate, tris (2-chloroethyl) phosphate, tris(1-chloro-2-propyl) phosphate, tetraethyl pyrophosphate, and tris(2-methylphenyl) phosphate. Examples of the non-polar organic solvent include, but are not limited to, diethyl ether, 1,2-dimethoxyethane, 1, 4-dioxane, tetraethylene glycol dimethyl ether (TEGDME), carbon tetrachloride, benzene, hexane, or methylene chloride.

In various aspects, the ionic conductor precursor may be present in the mixture in an amount ranging from about 1% to about 50%, or from about 5% to about 40% by weight of the mixture. Also, in various aspects, the organophosphate may be present in the mixture in an amount ranging from about 1% to about 99%, or from about 25% to about 75% by weight of the mixture. Also, in various aspects, the solvent may be present in the mixture in an amount ranging from about 1% to about 99%, or from about 25% to about 75% by weight of the mixture. Not intending to be bound by theory, in some aspects, the amount of the solvent may be adjusted to achieve one or more desired parameters, such as viscosity.

Also, in some aspects, the method of forming the battery may also include applying the mixture to the negative electrode 22, for example, to lithium metal at the negative electrode 22. In various aspects, application of the mixture to the negative electrode 22 may be by any suitable application process, examples of which may include, but are not limited to, a dip coating process, a spin coating process, a layer-by-layer (LBL) process, or a spray process. Generally, the mixture may be applied, for example, by way of a single applicative or multiple, sequential applications, to the negative electrode 22 in an amount sufficient for the interfacial layer 28 to have a desired parameter or combination of parameters, for example, a desired thickness. In various aspects, the duration for which the mixture may be applied to the negative electrode may be varied, for example, from about (5) minutes to about 24 hours, or from about five (5) minutes to about to about 10 hours, or from about 15 minutes to about to about 12 hours, or from about 30 minutes to about ten (10) hours, or from about one (1) hour to about five (5) hours, or from about one (1) hour to about two (2) hours, or for about one (1) hour, or about two (2) hours.

Also, in some aspects, the method of forming the battery may also include, after applying the mixture to the negative electrode 22, allowing and/or causing at least a portion of the non-polar organic solvent to be removed from the mixture, for example, to form a coating on a surface (e.g., the first major surface 23) of the negative electrode 22. For example, the mixture may be dried in situ. In some aspects, the mixture, may be dried in a room temperature environment or, additionally or alternatively, in a heated environment, in a negative pressure environment, an inert environment, or under other conditions suitable to effectuate removal of at least a portion of the non-polar organic solvent from the mixture.

In some aspects, application of the mixture to the negative electrode 22 and removal (for example, dissipation and/or evaporation) of the non-polar organic solvent from the mixture in situ, may result in a chemical reaction between at least a portion of the ionic conductor precursor and at least a portion of the organophosphate. In one example, the ionic conductor precursor comprises $LiNO_3$ and at least a portion of the organophosphate comprises trimethyl phosphate. In such an example, a portion of the $LiNO_3$ reacts with a portion of the trimethyl phosphate to yield $Li_3PO_4$. In such an example, the interfacial layer 28 may comprise $LiNO_3$ and $Li_3PO_4$ disposed (e.g., embedded) within an organic matrix that may include one or more organic species resulting from the reaction between the trimethyl phosphate and the $LiNO_3$ to form the $Li_3PO_4$.

In some aspects, with the mixture applied to the negative electrode 22, and after a desired duration have passed in order and a desired portion of the non-polar solvent has been removed (for example, allowing the mixture to be dried), the negative electrode 22 may be disposed with respect to (e.g., adjacent) the solid-state electrolyte 26, for example, such that the coating disposed on the negative electrode 22 forms a layer (e.g., the interfacial layer 28) between the negative electrode 22 and the solid-state electrolyte 26. Similarly, the positive electrode 24 may be disposed with respect to (e.g., adjacent) the solid-state electrolyte 26. Additionally, in some aspects, the layers of the electrochemical cell may be pressed together. For example, a pressure of from 0 MPa to about 500 MPa may be applied to press the layers of electrochemical cell together.

In some aspects, the method of forming the battery, as discussed herein, may include one or more additional, post-processing steps. For example, the electrodes and/or cells formed according to these methods may be subjected to additional processing to progress the electrodes and/or cells toward an intermediate product or the end-product, for example, the battery 20 discussed with respect to FIG. 1. For instance, in some aspects one or more tabs may be attached to one or more of the electrodes. For example, a negative tab may be attached (e.g., welded) to the negative electrode current collector 32 and a positive tab may be attached (e.g., welded) to the positive electrode current collector 34. Also, in some aspects, a cell may be sealed, such as by placement within an aluminum-laminated bag or container and/or by vacuum-sealing.

In some aspects, a battery formed according to the methods discussed herein, for example, the battery 20 of FIG. 1 that includes the interfacial layer 28, may exhibit improved performance, including improved battery life and/or improved cycling performance.

For example, in some aspects, the interfacial layer 28 may be effective to suppress side-reactions which may occur between the negative electrode 22 or a portion thereof (for example, the lithium metal) and the solid-state electrolyte 26 (for example, the solid-state electrolyte particles 30). Where an interfacial layer like the interfacial layer 28 of FIG. 1 is absent, one or more of the side-reactions between one or more components of the solid-state electrolyte 26 and lithium present at the negative electrode 22 may contribute to growth of an electronic-conductive interphase having decreased ionic conductivity, which may also contribute to increases in interfacial resistance and/or impedance, volume changes, and, potentially, fractures of the solid-state electrolyte 26. These undesirable effects contribute to shortened battery life, decreases cycling ability, and overall decreases in performance. Examples of such undesirable side-reactions may include reduction of germanium present within the LAGP and/or diffusion of aluminum between LAGP and the lithium metal. In some aspects, the side-reactions suppressed by the interfacial layer 28 may include reduction and/or diffusion of one or more species present within the solid-state electrolyte particles, such as reduction of germanium present within the LAGP and/or diffusion of aluminum between LAGP and the lithium metal.

Additionally or alternatively, in some aspects, the interfacial layer 28 may be effective to improve various characteristics associated with interfacial impedance, for example, at the interface between the negative electrode 22 and the solid-state electrolyte 26. For example, not intending to be bound by theory, the interfacial layer 28 may provide a route of ionic conduction between the negative electrode 22 and the solid-state electrolyte 26. For example, the ion conductors present within the interfacial layer 28 may be effective to provide an improved route of ion conduction through the interfacial layer 28.

Additionally or alternatively, and also not intending to be bound by theory, the interfacial layer 28 may also be effective to fill void spaces at or proximate to the interface between the negative electrode 22 and the solid-state electrolyte 26 (for example, between the first major surface 23 and the second major surface 27). For example, interparticle porosity and/or voids that are defined between various particles within the battery 20 (e.g., between the particles of the solid-state electrolyte 26) may reduce contact and/or conduction, which may lead to higher interfacial impedance and diminished battery performance. In various aspects, contact between the solid-state electrolyte 26 and the negative electrode 22 (for example, a lithium metal present at or on the negative electrode 22) may be improved by the interfacial layer 28 which may at least partially fill a portion of the interparticle spaces at or proximate to the interface between the negative electrode 22 and the solid-state electrolyte 26. For example, the interfacial layer 28 may be at least partially disposed within interparticle spaces so as to wet interfaces and/or fill void spaces between particles of the solid-state electrolyte 26 and the negative electrode 22.

EXAMPLES

Test cells are prepared to demonstrate the properties of an electrochemical cell prepared in accordance with certain aspects of the present disclosure. To prepare the test cell, a mixture including 1,2-Dimethoxyethane (DME), Trimethyl phosphate (TMP) and Lithium nitrate (LiNO$_3$) is prepared. A lithium metal is immersed in the mixture, and the time of immersion is varied across the cells. Particularly, the lithium metal of a first cell is immersed in the mixture for one hour and the lithium metal of second cell is immersed in the mixture for two hours. The mixture is dried to remove the DME and form a composite coating on the surface of the lithium metal. The coated lithium metal is assembled into a symmetrical cell including a solid-state electrolyte comprising Li$_{1+x}$Al$_x$Ge$_{2-x}$(PO$_4$)$_3$ (LAGP) and an interfacial layer or interlayer forms by the coating. For comparison, a reference symmetrical cell including a bare lithium metal and a solid-state electrolyte comprising LAGP is also prepared. As demonstrated by various testing, the cells including the interfacial layer exhibit lower interfacial impedance and excellent cycle performance.

Figure 2:
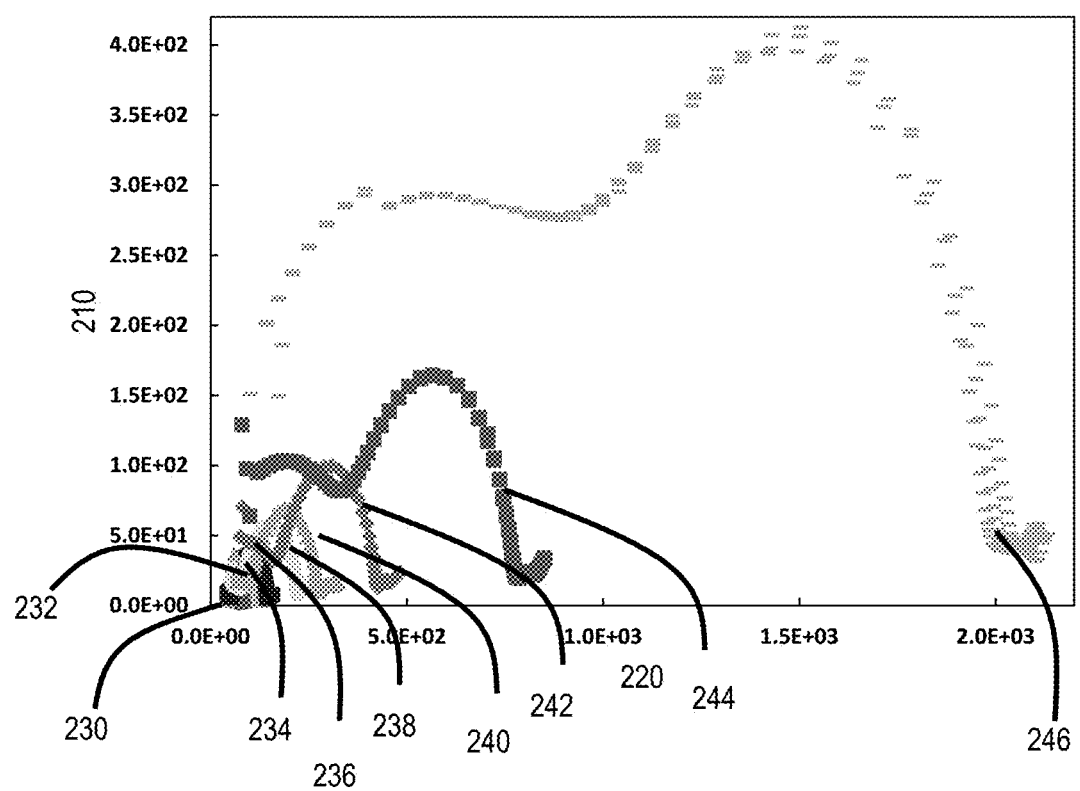
FIG. 2 is a graphical illustration of Electrochemical Impedance Spectroscopy (EIS) data for a first electrochemical cell having a lithium metal that was immersed in a mixture for one hour and formed according to the following disclosure.
Figure 3:
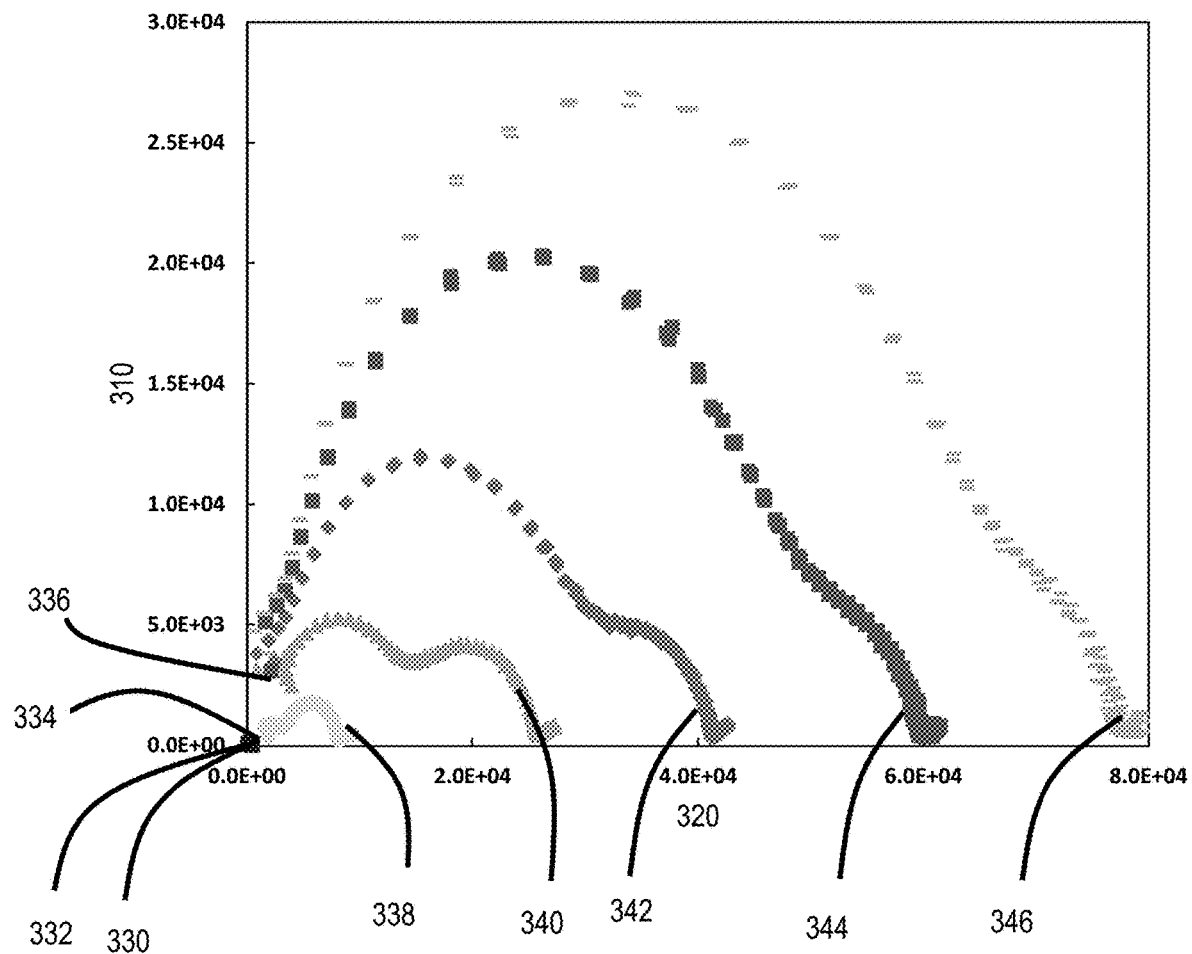
FIG. 3 is a graphical illustration of EIS data for a second electrochemical cell having a lithium metal that was immersed in a mixture for two hours and formed according to the following disclosure.
Figure 4:
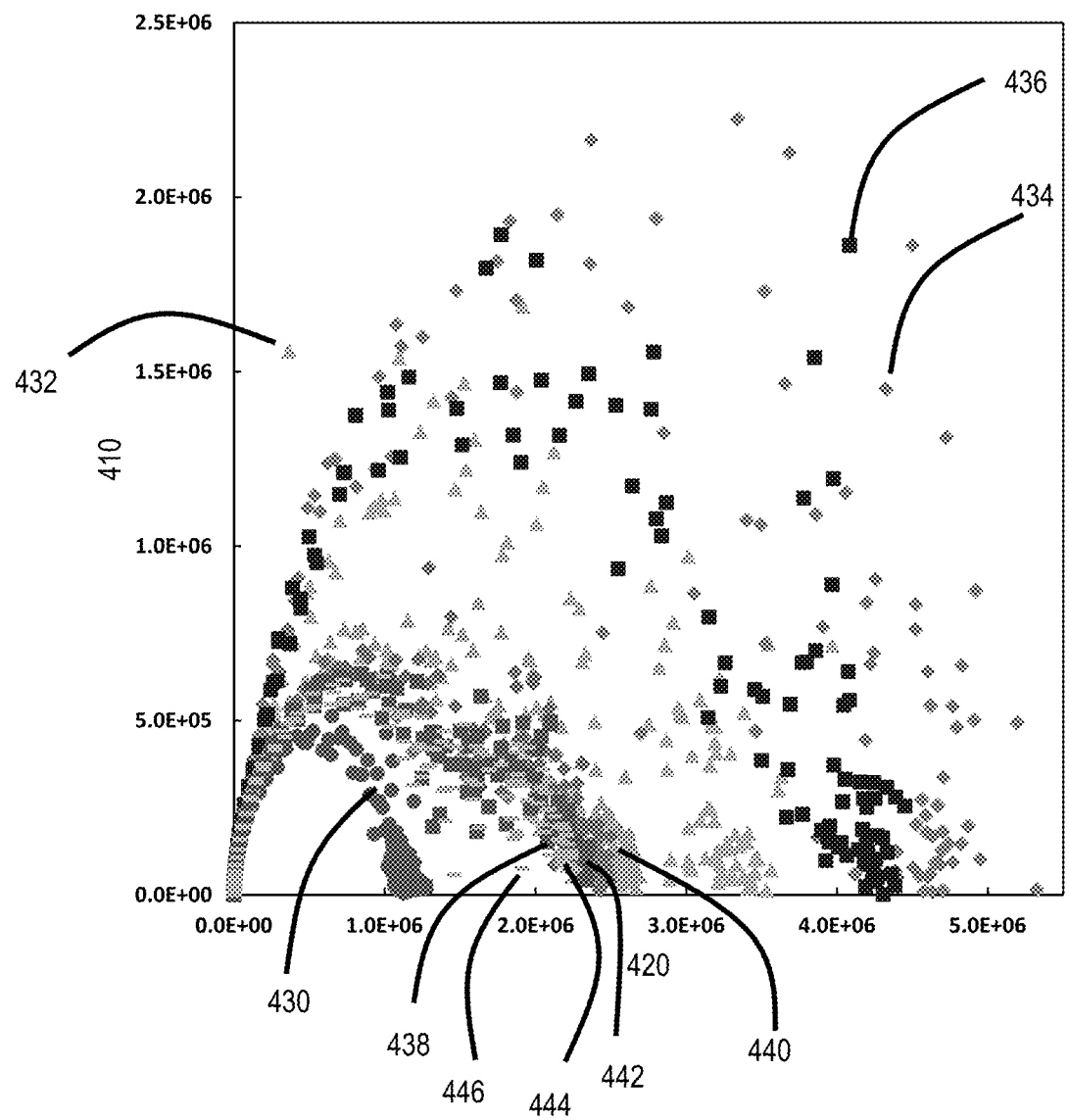
FIG. 4 is a graphical illustration of EIS data for a reference electrochemical cell.

Referring to FIG. 2, Electrochemical Impedance Spectroscopy (EIS) data is shown for the first cell (e.g., the cell having the lithium metal that is immersed in the mixture for one hour). FIG. 3 shows EIS data for the second cell (e.g., the cell having the lithium metal that is immersed in the mixture for two hours). FIG. 4 shows EIS data for a reference cell having bare lithium metal. For each of FIGS. 2, 3, and 4, EIS data is taken every hour for three (3) hours after cell assembly without a current applied and every 10 cycles with a current applied.

FIG. 2 shows the impedance, more particularly, Im(Z) 210 with respect to Re(Z) 220, for the first cell (e.g., the cell having the lithium metal that is immersed in the mixture for one hour) at various times and/or after various numbers of cycles, particularly, initially 230, after one (1) hour 232, after (2) hours 234, after (3) hours 236, at ten (10) cycles 238, at 20 cycles 240, at 30 cycles 242, at 40 cycles 244, and at 50 cycles 246.

FIG. 3 shows the impedance, more particularly, Im(Z) 310 with respect to Re(Z) 320, for the second cell (e.g., the cell having the lithium metal that is immersed in the mixture for two hours) at various times and/or after various numbers of cycles, particularly, initially 330, after one (1) hour 332, after (2) hours 334, after (3) hours 336, at ten (10) cycles 338, at 20 cycles 340, at 30 cycles 342, at 40 cycles 344, and at 50 cycles 346.

FIG. 4 shows the impedance, more particularly, Im(Z) 410 with respect to Re(Z) 420, for the reference cell (e.g., the cell having the bare lithium metal) at various times and/or after various numbers of cycles, particularly, initially 430, after one (1) hour 432, after (2) hours 434, after (3) hours 436, at ten (10) cycles 438, at 20 cycles 440, at 30 cycles 442, at 40 cycles 444, and at 50 cycles 446.

Referring to FIGS. 2 and 4, the first cell (i.e., the cell having the lithium metal that is immersed in the mixture for one hour) demonstrates a significant reduction in impedance in comparison to the reference cell (i.e., the cell having the bare lithium metal). Also, referring to FIGS. 3 and 4 the second cell (i.e., the cell having the lithium metal that is immersed in the mixture for two hours) demonstrates a reduction in impedance in comparison to the reference cell (i.e., the cell having the bare lithium metal). As also shown in FIGS. 3 and 4, even after 50 cycles, the first and second cells each demonstrate excellent protection against impedance, notably, with the first cell demonstrating better protection against impedance than the second cell.

Figure 5:
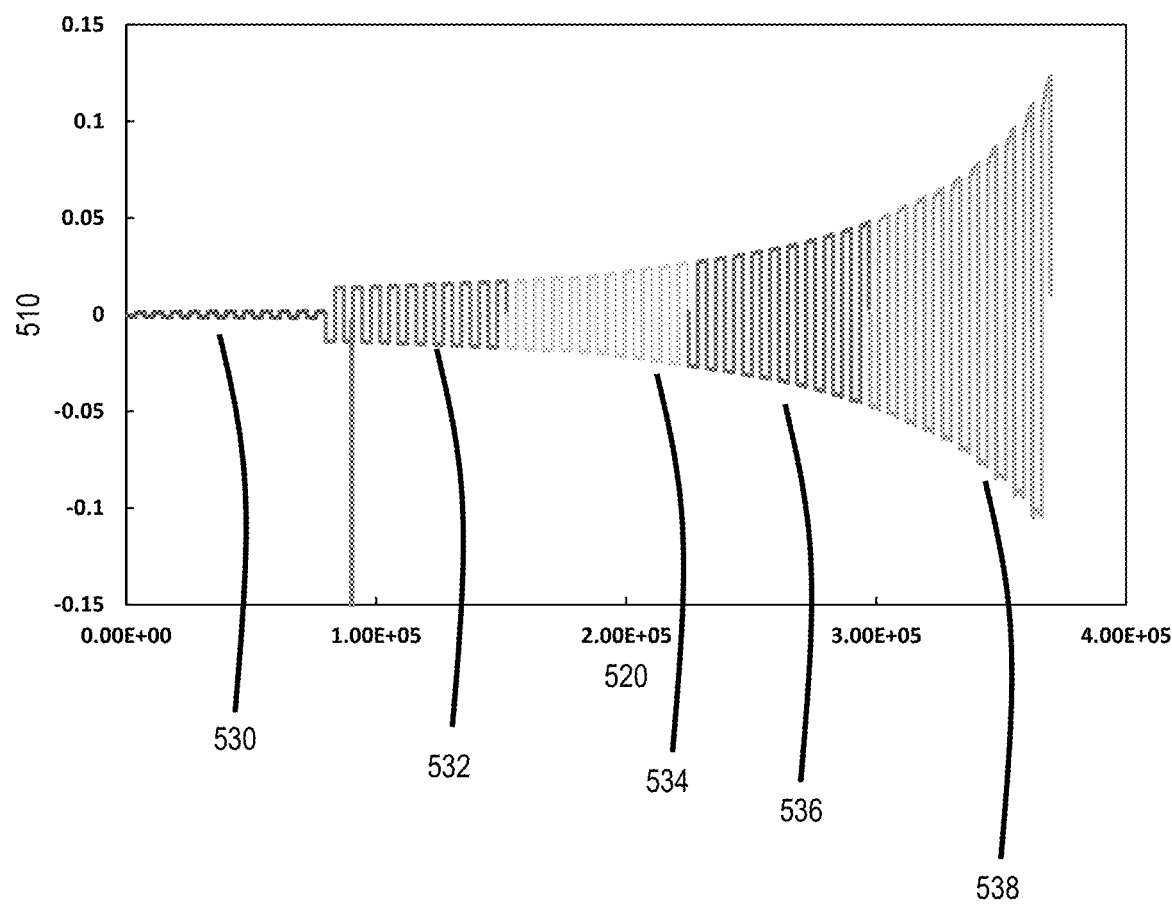
FIG. 5 is a graphical illustration of cycling data for the first electrochemical cell having a lithium metal that was immersed in a mixture for one hour and formed according to the following disclosure.
Figure 6:
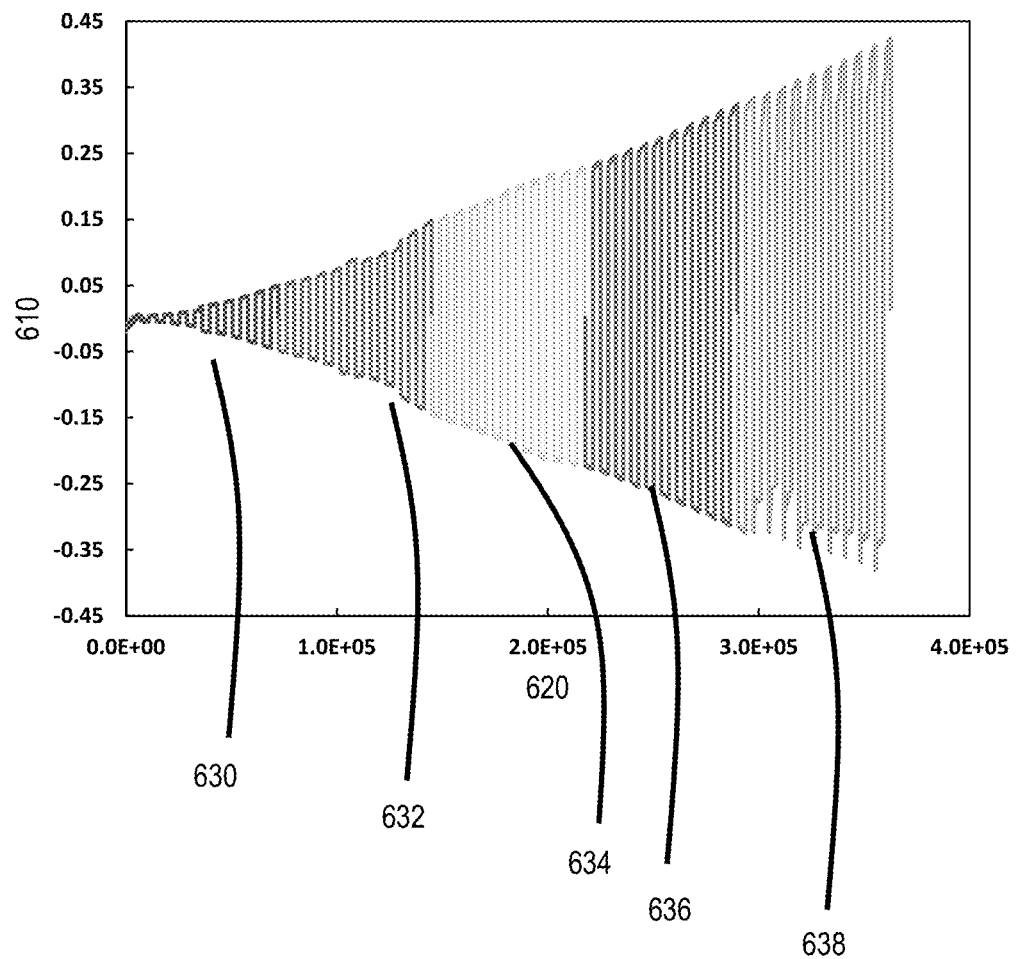
FIG. 6 is a graphical illustration of cycling data for the second electrochemical cell having a lithium metal that was immersed in a mixture for two hours and formed according to the following disclosure.
Figure 7:
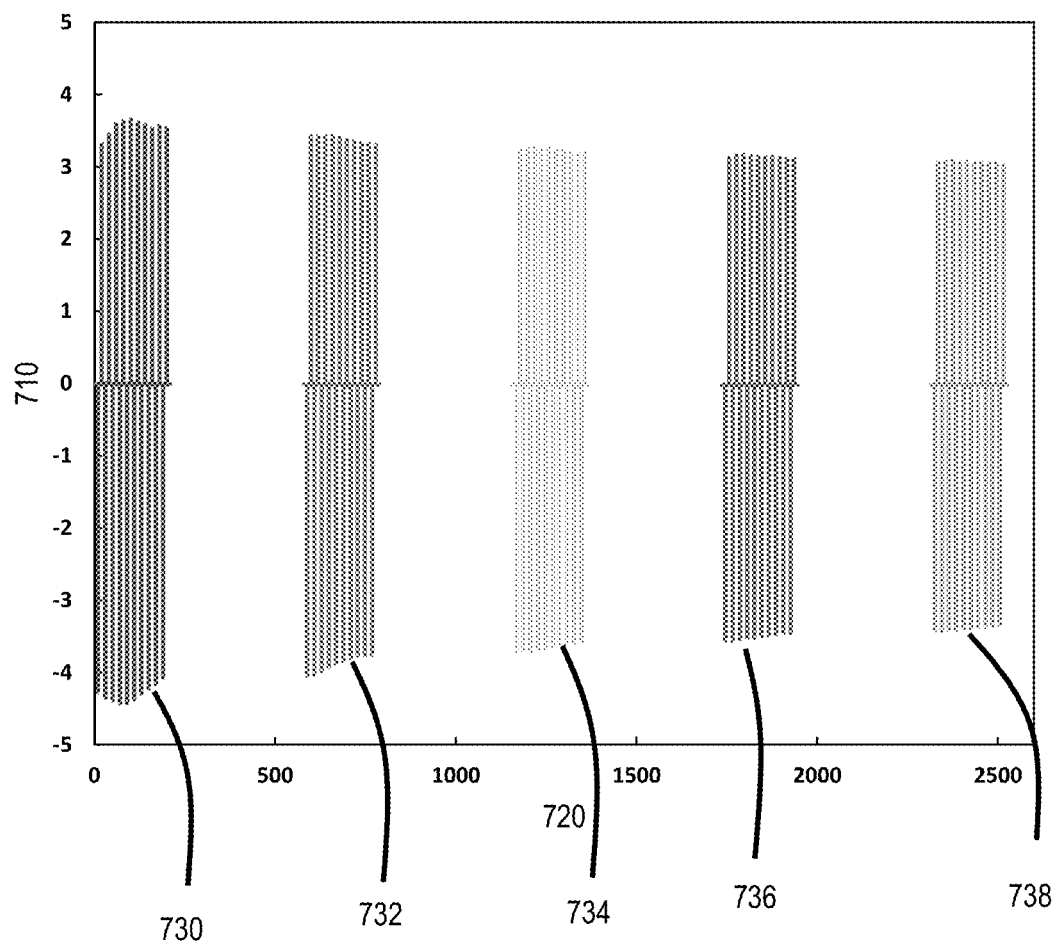
FIG. 7 is a graphical illustration of cycling data for the reference electrochemical cell.

Referring to FIG. 5, cycling data is shown for the first cell (e.g., the cell having the lithium metal that is immersed in the mixture for one hour). FIG. 6 shows cycling data for the second cell (e.g., the cell having the lithium metal that is immersed in the mixture for two hours). FIG. 7 shows cycling data for a reference cell having bare lithium metal. For each of FIGS. 5, 6, and 7, cycling data is taken every 10 cycles for 50 cycles.

FIG. 5 shows potential of the working electrode (E$_{WE}$) (V) 510 with respect to time (sec.) 520 for the first cell (e.g., the cell having the lithium metal that is immersed in the mixture for one hour) after various numbers of cycles, particularly, at ten (10) cycles 530, at 20 cycles 532, at 30 cycles 534, at 40 cycles 536, and at 50 cycles 538.

FIG. 6 shows potential of the working electrode ($E_{WE}$) (V) 610 with respect to time (sec.) 620 for the second cell (e.g., the cell having the lithium metal that is immersed in the mixture for two hours) after various numbers of cycles, particularly, at ten (10) cycles 630, at 20 cycles 632, at 30 cycles 634, at 40 cycles 636, and at 50 cycles 638.

FIG. 7 shows potential of the working electrode ($E_{WE}$) (V) 710 with respect to time (sec.) 720 for the reference cell (e.g., the cell having the bare lithium metal) after various numbers of cycles, particularly, at ten (10) cycles 730, at 20 cycles 732, at 30 cycles 734, at 40 cycles 736, and at 50 cycles 738.

As shown in FIGS. 5 and 6, the first and second cells demonstrate a much lower potential than the reference cell and demonstrate relatively good cycle stability. Also, and as shown in FIG. 7, the reference cell demonstrates such high interfacial impedance that the reference cell cannot be cycled.

Not intending to be bound by theory, the presence of the interfacial layer in each of the first and second cells is believed to be effective to prevent side reactions between lithium and LAGP, which is consistent with EIS data shown in FIGS. 2, 3, and 4. Moreover, the interfacial layer is believed to prevent the diffusion of, for example, aluminum, and side-reactions between lithium and LAGP. Not intending to be bound by theory, analysis of the first and second cells indicates that the first cell possesses more phosphorous compounds within the interfacial layer and, as such, may suppress diffusion and/or side-reactions better than the second cell.

The foregoing description of the aspects has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solid-state electrochemical cell that cycles lithium ions, the electrochemical cell comprising:
   a solid-state electrolyte defining a first major surface;
   an electrode defining a second major surface; and
   an interfacial layer disposed between the first major surface of the solid-state electrolyte and the second major surface of the electrode, the interfacial layer comprising an ion-conductor disposed in an organic matrix comprising an organophosphate, the ion-conductor selected from the group consisting of: $LiNO_3$, $Li_3PO_4$, $Li_3P$, $Li_2PO_2N$ (UPON), $Li_3PS_4$, $Li_3ClO$, LiF, $Li_2S$, $Li_3N$, ZnO, $Al_2O_3$, $SnO_2$, Au, Si, Ge, Mg, Al, In, polyethylene oxide (PEO), polypropylene (PP), 1-butyl-3-methylimidazolium-bis(fluorosulfonyl)imide (BMIM-FSI), particulate graphite, acetylene black, carbon fibers, carbon nanotubes, graphene, and combinations thereof.

2. The solid-state electrochemical cell of claim 1, wherein the electrode comprises lithium metal.

3. The solid-state electrochemical cell of claim 1, wherein the ion-conductor comprises $LiNO_3$, $Li_3PO_4$, or both.

4. The solid-state electrochemical cell of claim 1, wherein the solid-state electrolyte comprises $Li_{1+x}Al_xGe_{2-x}(PO_4)_3$ where $0<x<1$ (LAGP) or $Li_{1+x}Al_xTi_{2-x}(PO_4)_3$ where $0<x<1$ and $0<y<2$ (LATP), $Li_xLa_yTiO_3$ where $0<x<1$ and $0<y<1$ (LLTO), $Li_{2+2x}Zn_{1-x}GeO_4$ where $0<x<1$ (LISICON), $Li_{10}GeP_2S_{12}$ (LGPS), $Li_{3.25}Ge_{0.25}P_{0.75}S_4$, $Li_4GeS_4$, $Li_6PS_5Cl$, $Li_7La_3Zr_2O_{12}$ (LLZO), $Li_2PO_2N$ (UPON), or combinations thereof.

5. The solid-state electrochemical cell of claim 1, wherein the solid-state electrolyte comprises $Li_{1+x}Al_xGe_{2-x}(PO_4)_3$ where $0<x<1$ (LAGP).

6. The solid-state electrochemical cell of claim 1, wherein the interfacial layer has a thickness of greater than or equal to about 10 nanometers to less than or equal to about 500 nanometers.

7. The solid-state electrochemical cell of claim 1, wherein the interfacial layer is formed by a method comprising:
   preparing a mixture including an ionic conductor precursor, an organophosphate, and a non-polar organic solvent;
   applying the mixture to the electrode; and
   removing at least a portion of the non-polar organic solvent from the mixture to form the interfacial layer.

8. The solid-state electrochemical cell of claim 7, wherein the mixture is applied to the electrode for a duration of from about five minutes to about ten hours.

9. The solid-state electrochemical cell of claim 7, wherein the ionic conductor precursor comprises $LiNO_3$.

10. The solid-state electrochemical cell of claim 7, wherein the organophosphate comprises trimethyl phosphate (TMP), triethyl phosphate, tris(1,3-dichloro-2-propyl) phosphate, tris(2-chloroethyl) phosphate, tris(1-chloro-2-propyl) phosphate, tetraethyl pyrophosphate, and tris(2-methylphenyl) phosphate, or combinations thereof.

11. The solid-state electrochemical cell of claim 7, wherein the non-polar organic solvent comprises diethyl ether, 1,2-dimethoxyethane, 1,4-dioxane, tetraethylene glycol dimethyl ether (TEGDME), carbon tetrachloride, benzene, hexane, methylene chloride, or combinations thereof.

12. A method of making a solid-state electrochemical cell that cycles lithium ions, the method comprising:
   preparing a mixture including an ionic conductor precursor, an organophosphate, and a non-polar organic solvent;
   applying the mixture to at least one surface of an electrode;
   removing at least a portion of the non-polar organic solvent from the mixture to form a coating comprising the organophosphate on the at least one surface of the electrode, the coating comprising an ion-conductor disposed in an organic matrix comprising the organophosphate, the ion-conductor selected from the group consisting of: $LiNO_3$, $Li_3PO_4$, $Li_3P$, $Li_2PO_2N$ (UPON), $Li_3PS_4$, $Li_3ClO$, LiF, $Li_2S$, $Li_3N$, ZnO, $Al_2O_3$, $SnO_2$, Au, Si, Ge, Mg, Al, In, polyethylene oxide (PEO), polypropylene (PP), 1-butyl-3-methylimidazolium-bis (fluorosulfonyl)imide (BMIM-FSI), particulate graphite, acetylene black, carbon fibers, carbon nanotubes, graphene, and combinations thereof;
   positioning the electrode adjacent a solid-state electrolyte such that the coating is disposed between the electrode and the solid-state electrolyte; and
   pressing the electrode and the solid-state electrolyte together such that the coating forms an interfacial layer.

13. The method of claim 12, wherein the electrode comprises lithium metal.

14. The method of claim 12, wherein the mixture is applied to the electrode for a duration of about one hour.

15. The method of claim 12, wherein the ionic conductor precursor comprises $LiNO_3$.

16. The method of claim 12, wherein the organophosphate comprises trimethyl phosphate (TMP), triethyl phosphate, tris(1,3-dichloro-2-propyl) phosphate, tris(2-chloroethyl) phosphate, tris(1-chloro-2-propyl) phosphate, tetraethyl pyrophosphate, and tris(2-methylphenyl) phosphate, or combinations thereof.

17. The method of claim 12, wherein the non-polar organic solvent comprises diethyl ether, 1,2-dimethoxyethane, 1, 4-dioxane, tetraethylene glycol dimethyl ether (TEGDME), carbon tetrachloride, benzene, hexane, methylene chloride, or combinations thereof.

* * * * *